(12) United States Patent
Cuddihy et al.

(10) Patent No.: US 11,567,166 B2
(45) Date of Patent: Jan. 31, 2023

(54) LOCATING SYSTEMS AND METHODS FOR WIRELESS SEAT BELT MONITORING IN VEHICLES WITH REMOVABLE OR RECONFIGURABLE SEATS

(71) Applicant: Ford Global Technologies, LLC, Dearborn, MI (US)

(72) Inventors: Mark Cuddihy, New Boston, MI (US); Dilip Patel, Novi, MI (US); Mark Andre Zielinski, Bloomfield Hills, MI (US); Karthikeyan Sadatsharan, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 459 days.

(21) Appl. No.: 16/782,222

(22) Filed: Feb. 5, 2020

(65) Prior Publication Data
US 2021/0239786 A1 Aug. 5, 2021

(51) Int. Cl.
*B60R 22/48* (2006.01)
*G01S 5/14* (2006.01)
*H04B 1/3822* (2015.01)

(52) U.S. Cl.
CPC .............. *G01S 5/14* (2013.01); *B60R 22/48* (2013.01); *H04B 1/3822* (2013.01); *B60R 2022/4816* (2013.01); *B60R 2022/4866* (2013.01)

(58) Field of Classification Search
CPC .......................... G01S 5/14; B60R 2022/4816
See application file for complete search history.

(56) References Cited

U.S. PATENT DOCUMENTS

| 8,080,961 B2 | 12/2011 | Miller | |
| 10,848,610 B1* | 11/2020 | Luo | B60R 22/48 |
| 2005/0062595 A1* | 3/2005 | Hofbeck | B60R 22/48 340/457.1 |
| 2009/0058057 A1* | 3/2009 | Ghabra | B60R 21/01546 701/49 |
| 2009/0177357 A1* | 7/2009 | Long | B60R 22/48 701/45 |

(Continued)

FOREIGN PATENT DOCUMENTS

CN 103556901 B 1/2016

OTHER PUBLICATIONS

"Your Car's Key Fob May Have Hidden Features," Web page <https://www.consumerreports.org/cars-driving/your-key-fob-may-have-hidden-features/.html>, 6 pages, retrieved from the internet on Aug. 28, 2019.

*Primary Examiner* — Qutbuddin Ghulamali
(74) *Attorney, Agent, or Firm* — Frank Lollo; Eversheds Sutherland (US) LLP (57) ABSTRACT

Locating systems and methods for wireless seat belt monitoring in vehicles with removable or reconfigurable seats are provided herein. An example remote transceiver can be centrally located on a seat that is configured to be rearranged within a vehicle. The remote transceiver can include a processor and memory for storing instructions that include a unique code identifying the remote transceiver. The processor executes the instructions to receive low power signals from transmitters within an interior of the vehicle, determine received signal strength values of the low power signals. The received signal strength values are used by the vehicle receiver to determine a location of the remote transceiver within the vehicle.

19 Claims, 6 Drawing Sheets

(56) References Cited

U.S. PATENT DOCUMENTS

| | | | |
|---|---|---|---|
| 2009/0243892 A1* | 10/2009 | Cheung | A44B 11/2569 340/945 |
| 2014/0163774 A1* | 6/2014 | Demeniuk | G08C 17/02 701/2 |
| 2015/0002264 A1* | 1/2015 | Kitahara | G07C 9/00309 340/5.61 |
| 2016/0031417 A1* | 2/2016 | Kornek | G01S 7/282 701/2 |
| 2016/0114745 A1* | 4/2016 | Ricci | B60T 7/12 701/2 |
| 2016/0288732 A1* | 10/2016 | Schmotzer | B60R 22/48 |
| 2021/0239786 A1* | 8/2021 | Cuddihy | H04B 1/3822 |

* cited by examiner

LOCATING SYSTEMS AND METHODS FOR WIRELESS SEAT BELT MONITORING IN VEHICLES WITH REMOVABLE OR RECONFIGURABLE SEATS

FIELD

The present disclosure is generally directed to systems and methods for automatically determining a location of a seat belt buckle in a vehicle where the seat associated with the seat belt buckle is reconfigurable or removable.

BACKGROUND

Automotive equipment manufacturers are introducing rear seat belt monitors to supplement the seat belt monitors in the front of the seat. The rear seat belt monitors are typically similar in operation and design to the front seat systems. However, one application which requires a different design is the case of removable rear seats. Removable seats are featured in vans and busses, in order to convert room for multiple passengers into cargo space. In this scenario, the wires utilized to connect the seat belt switches to an electronic module need to include a disconnect to enable removal of the seat. This can cause concerns for the end-user, who needs to remember to disconnect the wires before seat removal and reconnect them after installation. As a result, manufacturers are designing alternate methods to communicate the rear seat belt status (buckled or unbuckled) to the vehicle cluster, for driver display. Engineers have investigated using connectors that automatically engage/disengage with seat removal but the package constraints and durability requirements proved difficult. A wireless system is now being pursued which requires no action on the part of the end user to disengage/reengage the seat belt buckle reminder while removing and reinstalling the seat.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for automatic location of seat belt buckles in vehicles, and specifically in vehicles where seats can be removed, rearranged and/or reconfigured. Each seat in the vehicle can be provided with one or more seat belt buckles. A seat belt buckle of the present disclosure can comprise a transceiver that is used to transmit and receive data such as unique codes that identify the transceiver/seat belt buckle, and a buckle status (i.e., buckled or unbuckled). The transceiver can be associated with a seat during the manufacturing process. These data logically linking the seat with the transceiver can be stored in a vehicle receiver, as will be discussed in greater detail herein.

Due to seat positioning or reconfiguration, seat belt buckles may be adjacently located in close proximity to one another. When signals transmitted or received by the transceivers are used to locate the seat belt buckles in the vehicle, it may be difficult to determine or differentiate between transceivers. Also, generally speaking, signals from each seat belt buckle in the vehicle reflect off of surfaces in the car's interior and become distorted. The vehicle receiver of the present disclosure can be configured to calculate a location of each buckle based on triangulation and/or trilateration and there is a variation around the accuracy of that location calculation. For example, if the vehicle receiver calculates that a buckle transceiver is 24 inches from one vehicle wall and 36 inches from the front of the vehicle, the actual location may be vary anywhere from four to six inches in any lateral or longitudinal direction from the calculated value. In this situation, two adjacent buckles are close enough that the calculated locations can overlap. When using only gross location information, it may not be possible to determine whether the buckle transceiver is associated with a left or right orientation on a seat, even though the calculated locations may evidence a lateral difference. For example, the difference may be within a typical variation on the RF signal calculation, due to a number of factors, like reflections of the signal off of the interior or signal absorption by occupants or other objects in the vehicle's interior.

The systems and methods disclosed herein enable accurate determinations of seat belt buckle locations (and which seat they are associated with), even when the seat belt buckles are located in close proximity to one another, and even when collocated. The systems and methods disclosed herein can also be configured to determine a location of a seat that has been reconfigured from a forward-facing configuration to a rearward-facing configuration. In addition to identifying seat locations, the systems and methods herein can identify and display buckle statuses of the seat belt buckles of each seat.

ILLUSTRATIVE EMBODIMENTS

One of the main design challenges involved in incorporating wireless rear seat belt monitor systems is the case of removable/interchangeable seats. Where the wired system can accommodate swapping seats to different locations and still report the correct seated row to the instrument cluster display, a wireless system has no inherent method of knowing which row the seat is in. The seat location can be identified and programmed into the vehicle's Radio Frequency (RF) receiver at vehicle assembly, but the customer has the option to remove and potentially swap seats during normal use. This interior flexibility is a desired feature and so it is advantageous to design a system that does not require the seats to be keyed to a specific location. Therefore, a rear seat belt monitor system is required to identify the seat position as well as the buckle status so that the driver can identify which passenger has unbuckled.

Figure 1:
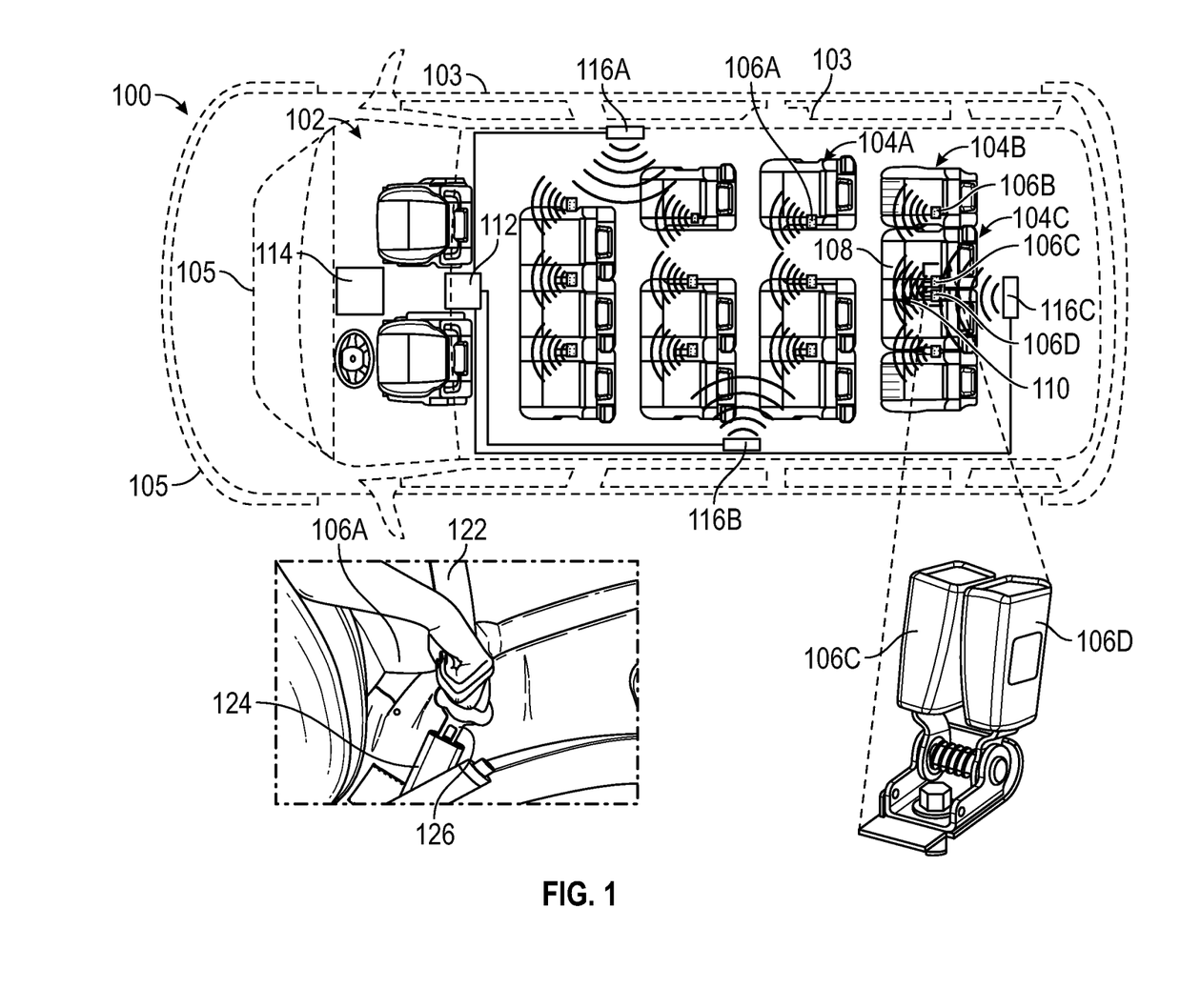
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. A vehicle 102 can include a plurality of seats 104A-104C, with seat 104A and 104B being single seats and seat 104C being a double seat. Seat 104A includes a seat belt buckle assembly 106A, whereas seat 104B includes a seat belt buckle assembly 106B, and seat 104C includes two seat belt buckle assemblies 106C and 106D. In this example, the two seat belt buckle assemblies 106C and 106D are located in close proximity to one another. In general, the two-seat belt buckle assemblies 106C and 106D can include a dual buckle arrangement that is positioned in the middle of the seat 104C, which as noted above is a double seat (i.e., bench seat).

In more detail, a broadcast area 108 of a transceiver associated the seat belt buckle assembly 106C is located adjacently to a broadcast area 110 of a transceiver associated the seat belt buckle assembly 106D. Broadly, two transceivers are considered to be in close proximity when the spatial distance between the two transceivers is minimal. As will be discussed in greater detail infra, an auto-location method utilizes signal strength values calculated by the transceivers associated with the seat belt buckles. When a spatial distance between two transceivers is small, this signal strength comparative process becomes difficult or unreliable and additional information may be required in order to differentiate between two transceivers. To be sure, a size of the spatial distance can vary based on the methods or systems used to detect a location of each of the transceivers. As will be discussed in greater detail herein, a plurality of transmitters disposed within the vehicle cabin can be used to determine sense a location of each of the transceivers using triangulation and/or trilateration (which can include using relative signal strengths). Broadly, the calculated locations of adjacent transceivers may be determined to overlap. The present disclosure contemplates differentiating between these transceivers from one another using various systems and methods.

Figure 2:
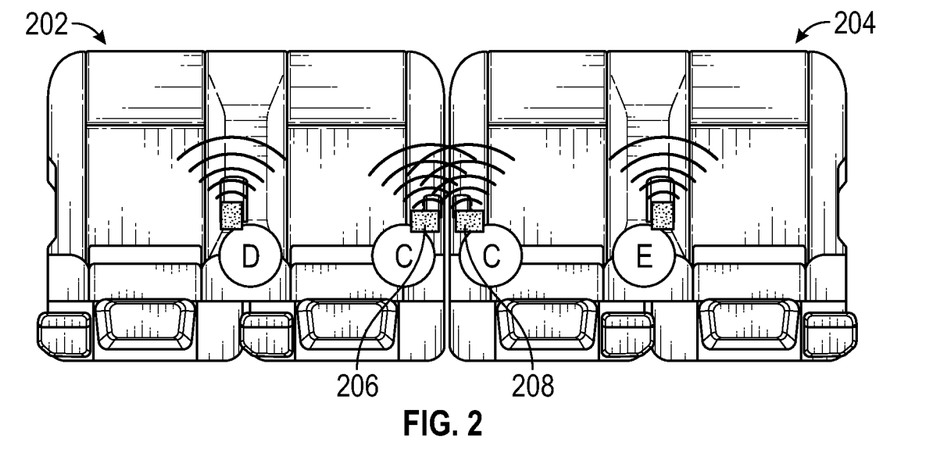
FIG. 2 depicts a scenario where seat belt buckle assemblies associated with two different seats have transceivers that are collocated.
Figure 3:
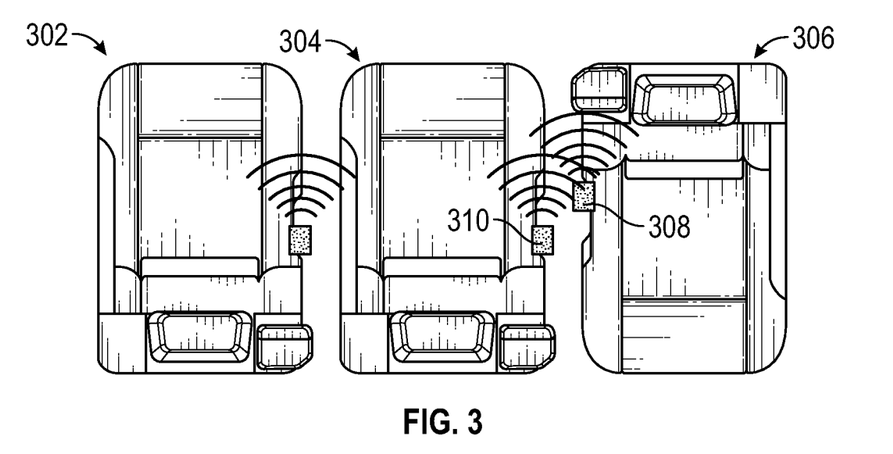
FIG. 3 depicts a scenario where one of two adjacent seats has been having transceivers that are collocated.

In general, reconfiguration of seats within the vehicle 102 may result in seat belt buckle assemblies that were not originally located in close proximity to one another to subsequently be positioned in close proximity by the movement of seats. FIG. 2 illustrates an embodiment where two seats have been reconfigured such that two seat belt buckle assemblies are now in close proximity. FIG. 3 illustrates an embodiment where a seat has been reconfigured from a forward-facing configuration to a rearward-facing configuration. Each of the embodiments illustrated in FIGS. 2 and 3 is described in greater detail infra.

The vehicle 102 also includes a vehicle receiver 112, a driver display 114, a plurality of low frequency (LF) transmitters (also referred to generally as vehicle antennas), such as LF transmitters 116A-116C. The vehicle receiver 112 is a wireless radio frequency (RF) receiver that comprises a processor 118 and memory 120. The memory 120 stores instructions that are executed by the processor 118 to perform aspects of seat location determination, as well as buckle status determination as disclosed throughout. When referring to operations executed by the vehicle receiver 112 it will be understood that this includes the execution of instructions by the processor 118. The driver display 114 can include any suitable visual display present within the vehicle 102, such as an infotainment system or other similar human machine interface. The vehicle receiver can communicate with the LF transmitters 116A-116C and the transceivers of the seat belt buckle assemblies over a communications interface 129, such as an antenna.

In general, a seat belt buckle assembly, such as the seat belt buckle assembly 106A comprises a seat belt 122, a seat belt buckle 124, a tongue 126, and a transceiver 128. The transceiver 128 can communicatively couple with the vehicle receiver 112 using a communications interface 131, such as an antenna. The communications interfaces included in the transceiver 128 the vehicle receiver 112 can utilize any desired protocol such as Wi-Fi, Bluetooth, Near-Field Communications (NFC), and other similar protocols that would be known in the art. In some instances, the transceiver 128 can comprise an LF receiver 133 that receives LF signals from the LF transmitters 116A-116C. Data that is indicative of the LF signals such as received signal strength, signal phase, and so forth, can be transmitted to the vehicle receiver 112 by the communications interface 131 using ultra-high frequency (UHF).

Stated otherwise, LF signals can be transmitted through the through the LF transmitters 116A-116C as mentioned above. The LF receiver in each seat belt buckle receives and characterizes the LF transmissions from each of the LF antennas separately. The received LF characterization can include received signal strength, signal phase, and so forth. The characterizations of each of the received LF signals is then transmitted back to the vehicle receiver 112 where the information is process and the transceiver's location is determined.

An alternate method includes processing of the received LF signal in the seat belt buckle assembly and the location of the seatbelt buckle is transmitted by the seatbelt buckle assembly to the vehicle receiver 112.

The transceiver 128 can be located within the seat belt buckle 124. The seat belt buckle assembly 106A can also comprise a buckle switch 130. The buckle switch 130 generates a signal that indicates when the tongue 126 is inserted (e.g., buckled) or removed (e.g., unbuckled) from the seat belt buckle 124. The signal generated by the buckle switch 130 is referred to as a buckle status.

The transceiver 128 can comprise a processor 132 and memory 134. The memory 134 stores instructions that are executed by the processor 132. The transceiver 128 can store and transmit a unique Transmitter Identification Code (TIC), the belt buckle status (fastened or unfastened), and other helpful information such as battery charge status. The TIC is indicative of the transceiver 128 or may be indicative of the seat belt buckle assembly in general. The vehicle receiver 112 receives these signals and uses them to identify the transmitter and acquire seat belt buckle status. The vehicle receiver 112 can be communicatively coupled to the driver display 114 on an instrument panel, for example.

It will be understood that each seat in the vehicle 102 can be identified using a specific seat identifier. When the seat belt buckle assembly 106A is installed during vehicle manufacturing, the vehicle receiver 112 can associate a unique identifier for the seat with the TIC of the seat belt buckle assembly 106A. Thus, the initial seat positions determined during vehicle manufacturing are stored for later use by the vehicle receiver 112. Additional seat information can be provided as well such as whether the seat is a single bucket or multiple bucket seat. These data are useful in allowing the vehicle receiver 112 to identify which seat a seat belt buckle assembly is associated with when two seat belt buckle assemblies are collocated. Additional disclosure regarding determining collocation of seat belt buckle assemblies is provided infra.

The vehicle receiver 112 can execute an auto-location feature to determine a general or gross location of each transceiver/seat belt buckle assembly within the vehicle. That is, the vehicle receiver 112 can determine which seat each transceiver is transmitting from, and thus identify the seat belt buckle for which the transceiver is transmitting a buckle status.

The transceivers of the seat belt buckle assemblies can communicate with the LF transmitters 116A-116C, located around the vehicle's interior. The seat belt buckle transceivers can receive transmissions from at least a portion (or potentially all) of the LF transmitters 116A-116C. The transceiver 128 can quantify a Received Signal Strength Indicator (RSS) values from each of the LF transmitters 116A-116C. The transceiver 128 can transmit the RSSI values to the vehicle receiver 112 for analysis. Generally, the vehicle receiver 112 may use the RSSI values to determine a location of each of the transceiver 128. By way of example, the transceiver of the seat belt buckle assembly 106B may determine a similar signal strength relative to LF transmitters 116A-116C as the transceiver is approximately equidistantly spaced from each. By contrast, the transceiver of the seat belt buckle assembly 106C may determine greater signal strength from LF transmitter 116C than from LF transmitter 116B or LF transmitter 116A, as the transceiver is very close to LF transmitter 116C. These spatial distances and directionality between a transceiver and an LF transmitter differences in RSSI values.

Variations in the LF signal due to transmitter orientation, absorption by occupants/cargo, measurement error, and so forth may cause the auto-location results to vary, resulting in a tolerance around a given location in any direction. Careful placement of the LF transmitters 116A-116C can reduce or eliminate these variables to the point where one seat belt buckle position can be discerned from another.

In one example, if the vehicle receiver 112 calculates that the seat belt buckle assembly 106C is located 24 inches from a first vehicle wall 103 and 60 inches from a front 105 of the vehicle, the actual location may be within some tolerance such as four to six inches in any lateral or longitudinal direction from a calculated value (similar tolerances can be established for distance values calculated relative to the front 105). For example, the seat belt buckle assembly 106C could be located anywhere within a range of 30 inches to 18 inches from the first vehicle wall 103. Approximate distances from other vehicle surfaces can also be calculated and used to determine a gross location of a transceiver of a corresponding seat belt buckle assembly.

In this situation, two adjacent buckles, such as seat belt buckle assemblies 106C and 106D are close enough in proximity to one another that the calculated locations for each of the seat belt buckle assemblies 106C and 106D are considered to be overlapping. In this case we do not know for certain which one is on the left or right, even though the calculated locations may indicate a lateral difference or spacing from the first vehicle wall. The difference is within the typical variation on the RF signal strength calculation, due to a number of factors, like reflections of the signal off of the interior or signal absorption by occupants. For purposes of explanation, it will be assumed that seat belt buckle assemblies 106C and 106D have calculated locations that overlap.

As noted above, the seat belt buckle assemblies 106C and 106D are located in close proximity. Thus, the vehicle receiver 112 may determine that the transceivers of these seat belt buckle assemblies 106C and 106D are collocated (e.g., calculated locations that overlap). Without sufficient spatial separation, the vehicle receiver 112 may be unable to differentiate between these seat belt buckle assemblies 106C and 106D. That is, the seat belt buckle assembly 106A has insufficient spatial separation from the seat belt buckle assembly 106B. This spatial separation would result in the RSSI values determined by the transceiver of the seat belt buckle assembly 106A as having different magnitudes than the RSSI values determined by the transceiver of the seat belt buckle assembly 106B. On the other hand, the collocation of the seat belt buckle assemblies 106C and 106D would likely result in the transceivers of these assemblies having RSS signals that indicate that these seat belt buckle assemblies 106C and 106D are in close proximity to one another. Thus, the vehicle receiver 112 cannot identify or differentiate the seat belt buckle assemblies by gross location alone.

To assist in these instances where differentiation by gross location is not possible or is difficult, the transceiver 128 can store and transmit an augmented TIC. That is the original TIC that identifies the transceiver/seat belt buckle assembly can be enhanced with an orientation value that identifies an orientation of the transceiver/seat belt buckle assembly relative to the seat. For example, the orientation value could indicate that the transceiver/seat belt buckle assembly is on the left side of the seat, whereas a different orientation value could indicate that the transceiver/seat belt buckle assembly is on the right side of the seat. In the dual seat example above, the seat belt buckle assembly 106C could have an orientation value that indicates that it is on the left-hand of one half of the double seat 104C. The seat belt buckle assembly 106D could have an orientation value that indicates that it is on the right-hand of one half of the double seat 104C. That is, the seat belt buckle assembly 106C is to the left of a right-most seat position of the double seat 104C and the seat belt buckle assembly 106D is to the right of a left-most seat position of the double seat 104C. The TIC can be programmed by a seat manufacturer, or programmed when installing identical buckles in different orientations, or the TIC could be programmed by a seat belt buckle supplier, and assembly orientation controlled via a mechanical key and/or part number tracker.

In general, the unique code and the orientation value assigned to the transceiver 128 are used by the vehicle receiver 112 to differentiate the transceiver 128 from other transceivers within the vehicle. As the transceivers are each associated with a specific seat, general determinations of the location of the transceivers are understood to indicate a seat position. The addition of the orientation value allows for more detail differentiation when transceivers are collocated.

In an example use case, the vehicle receiver 112 can triangulate and/or trilaterate the location of each of the seat belt buckle assemblies 106C and 106D using the RSSI values received from their respective transceivers. This can occur by determining the relative distance of a transceiver from each of the LF transmitters 116A-116C based on the RSS signals. Each of the LF transmitters 116A-116C can append identifying data to the low-frequency signals they emit, which allows the signal strength to be correlated to a specific transmitter.

The vehicle receiver 112 may determine that the seat belt buckle assemblies 106C and 106D are collocated or approximately collocated. Once it is determined that seat belt buckle assemblies 106C and 106D are collocated, the vehicle receiver 112 can utilize the orientation values transmitted by the transceivers of the seat belt buckle assemblies 106C and 106D to differentiate between the seat belt buckle assemblies 106C and 106D. Since each transceiver is unique to a seat, the location of the transceiver is equated to the location of the seat. The vehicle receiver 112 can also determine buckle status of the seat belt buckle assemblies and then display the location and buckle status of the seat belt buckle assemblies on the driver display 114.

Stated otherwise, a transceiver can store and transmit a right hand side/left hand side identifier within the Transmitter ID Code (TIC), in addition to a visible differentiator so the buckles can be easily visually identified to facilitate assembly or service. For example, a value in the TIC could be assigned a "1" if that seat belt buckle transceiver is located on the right-hand side of the seat and a "0" if the seat belt buckle transceiver is located on the left-hand side of the seat. Thus, both transceivers in a double buckle can be determined by the vehicle receiver 112 as being collocated. Exact seat positions of the two transmitters can be discerned by the vehicle receiver 112 using the TICs of each transceiver.

Referring now to FIG. 2, a pair of dual seats 202 and 204 is illustrated as being arranged side-by-side. This arrangement places seat belt buckle assemblies 206 and 208 in close proximity. To be sure, the seat belt buckle assemblies 206 and 208 are configured identically to the seat belt buckle assembly 106A of FIG. 1. In contrast with the collocated seat belt buckle assemblies disclosed and described with respect to FIG. 1, the seat belt buckle assemblies 206 and 208 are associated with different seats. That is, the seat belt buckle assembly 206 is associated with seat 202 and the seat belt buckle assembly 208 is associated with seat 204. A similar RSSI value analysis can be performed, which would indicate that the seat belt buckle assemblies 206 and 208 are collocated. The TICs (e.g., unique device identifying codes) broadcast by the transceivers of the seat belt buckle assemblies 206 and 208 can be used to determine that the seat belt buckle assemblies 206 and 208 are associated with different seats. The orientation value may not be necessary in some instances.

FIG. 3 illustrates a scenario which includes three seats 302, 304, and 306. The seat 306 has been rearranged so that it faces rearwardly as compared to the seats 302 and 304 which are arranged to face forwardly. In general, the directionality of the seat 306 is 180 degrees opposite from the seats 302 and 304. The specific facings of these seats are not intended to be limiting, but are merely used for describing aspects of the present disclosure. In this example, a seat belt buckle assembly 308 associated with the seat 306 that is in close proximity to a seat belt buckle assembly 310 associated with the seat 304. To be sure, the seat belt buckle assemblies 308 and 310 are identical in construction to the seat belt buckle assembly 106A disclosed above with respect to FIG. 1. Thus, each of the seat belt buckle assemblies 308 and 310 includes a transceiver. Thus, each of the seat belt buckle assemblies 308 and 310 includes a transceiver. The transceivers may be determined to be in close proximity or collocated using the triangulation and/or trilateration or gross auto-location methods disclosed above.

Figure 4:
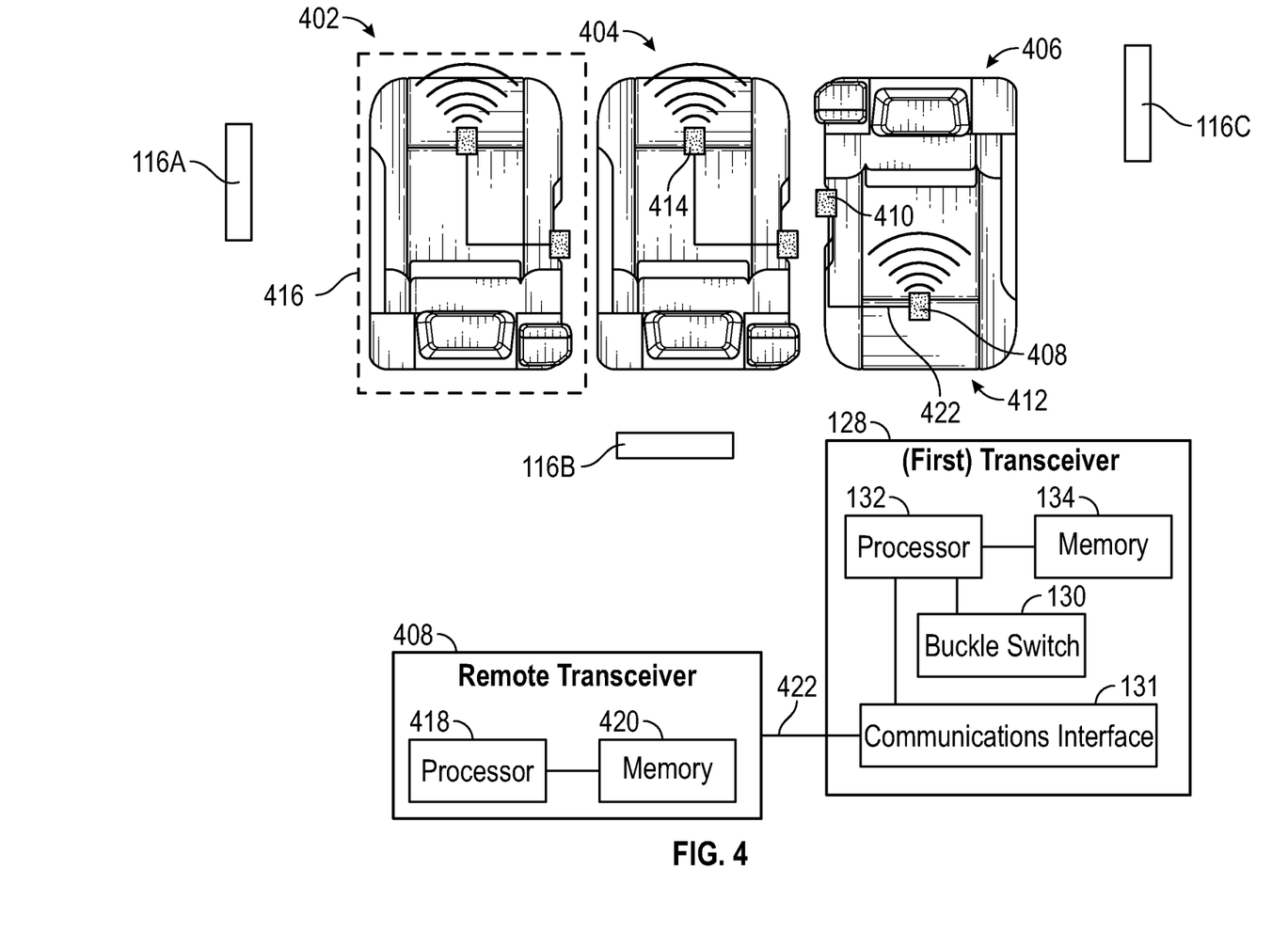
FIG. 4 depicts the scenario of FIG. 3 with seats that have been modified to include a remote transceiver.

FIG. 4 illustrates seats 402, 404, and 406 that have been modified to include additional components that allow for a position, orientation, and directionality determinations. The illustrated seat representations can be included in a display that identifies where a seat is located as well as a buckle status of the seat. The configuration of seat 406 will be described, but this configuration can be used in any seat that is designed to be reconfigured with respect to directionality. For example, seat 406 can include a remote transceiver 408 that is communicatively coupled to a seat belt buckle assembly 410. To be sure, the seat belt buckle assembly 410 can be identical in construction to the seat belt buckle assembly 106A disclosed above with respect to FIG. 1. The remote transceiver 408 can be communicatively coupled to the seat belt buckle assembly 410 (and specifically processor of a transceiver of the seat belt buckle assembly) using a wired connection, such as a cable. The remote transceiver can comprise a Hall-effect switch to determine buckle and/or tongue presence. Other components such as a processor, battery, or antenna could be located in a connected seat belt buckle assembly.

The remote transceiver 408 may be centrally located on the seat 406, near a terminal end 412 of the seat 406. The positioning of the remote transceiver 408 at the terminal end 412 of the seat 406 allows for spatial separation between the remote transceiver 408 of the seat 406 and an adjacent remote transceiver 414 that may be located in the seat 404. To be sure, the remote transceiver 408 can be disposed on a terminal end of the seat, such that when the seat is rearranged, regardless of an orientation of the seat, the remote transceiver 408 is not collocated with the adjacent remote transceiver 414 of an adjacent seat, such as seat 404.

The remote transceiver 408 can also broadcast a TIC that identifies the remote transceiver 408. The remote transceiver 408 can be configured to receive and process LF transmitters positioned within the vehicle (see FIG. 1 as an example). The TIC may identify that the remote transceiver 408 is associated with a rearrangeable seat.

The remote transceiver 408 can be configured to operate similarly to the transceiver 128 disclosed with respect to FIG. 1. Thus, the remote transceiver 408 can be configured similarly to the transceiver 128. The remote transceiver 408 can comprise a processor 418 and a memory 420 for storing instructions such as a TIC.

The remote transceiver 408 and the seat belt buckle assembly 410 can cooperate in some instances. The remote transceiver 408 can communicate with LF transmitters, such as the LF transmitters 116A-116C of FIG. 1. The remote transceiver 408 can receive low power signals from transmitters within an interior of the vehicle. Thus, the remote transceiver 408 can be receivers in some instances, rather than transceivers. The remote transceiver 408 can provide the low power signals through a wired connection 422 to the transceiver 128 associated with the seat belt buckle assembly 410. The transceiver 128 can be configured to determine received signal strength values of the low power signals and transmit these values to a vehicle receiver (see vehicle receiver 112 of FIG. 1).

Rather than relying on the transceiver 128, the remote transceiver 408 can also be configured to determine received signal strength values of the low power signals and transmit the same to a vehicle receiver. The remote transceiver 408 can store its own a unique code identifying the remote transceiver, as well as receive low power signals from transmitters within an interior of the vehicle, determine received signal strength values of the low power signals, and transmit the received signal strength values to a vehicle receiver. As noted above, the vehicle receiver can use the received signal strength values to determine a location of the remote transceiver 408 within the vehicle. The vehicle receiver can triangulate and/or trilaterate a location of the remote transceiver 408 based on the received signal strength values. As noted above, a location of the transceiver 408 is indicative of a location of the seat 406. The vehicle receiver can be programmed to associate the transceiver 408 with the seat 406, such that determinations regarding transceiver 408 are indicative of the location of the seat 406.

Both the remote transceiver 408 and the transceiver 128 of the seat belt buckle assembly 410 can independently receive and process low power signals. Each device can also transmit received signal strength values, unique codes, and/or an orientation value. In addition to the received signal strengths, the seat belt buckle assembly 410 can include a buckle switch. As noted above, the buckle status of the seat belt buckle 410 indicates whether the seat belt buckle is buckled or unbuckled. The remote transceiver 408 can transmit this buckle status, or alternatively, the buckle status can be transmitted by the transceiver 128 of the seat belt buckle assembly 410.

A system can be created that includes the remote transceiver 408 in wired coupling with the transceiver 128 of the seat belt buckle assembly 410. The system can also include a vehicle receiver, as well as a plurality of LF transmitters that are located throughout the vehicle interior.

The illustration of FIG. 4 can be represented for use as a display provided to a driver of the vehicle. This representation can be augmented in some instances. For example, based on information received from the transceiver associated with seat 402, it can be determined that the seat 402 is in an unbuckled state. To identify this unbuckled state, a representation of the seat is highlighted with a dotted, rectangular shape 416 that can be colored and hue, such as red. When a seat is not highlighted, it can be inferred that the seat is either not occupied, or the seat belt is in a buckled state.

In sum, the wireless system can be adapted to utilize a remote transceiver for each seat, and specifically seats that can be directionally reoriented 180° relative to one another. The remote transceiver can be mounted in a central position in the seat, and wired remotely to a buckle switch in the seat belt buckle. With this configuration, a seat flipped 180° would still have sufficient separation to be located using the wireless positioning method.

Because the configurations disclosed in FIGS. 1-4 can be collectively combined, three unique location strategies can be combined, where all seating locations can be determined given the combination of (1) gross location measurement achieved by auto-location, combined with (2) more granular orientation information relative to the seat (e.g., left or right-handed orientation), as well as (3) using a remote transceiver in seats that are configured to be directionally reoriented. In some instances, the seating locations can be determined given the combination of (1) gross location measurement achieved by auto-location, combined with (2) more granular orientation information relative to the seat (e.g., left or right-handed orientation). In sum, the systems and method disclosed herein utilize wireless data transmission for removable seats to locate any seat belt buckle and its seating orientation, even when two buckles are in close proximity or flipped 180°, with the minimum effect on vehicle costs.

Figure 5:
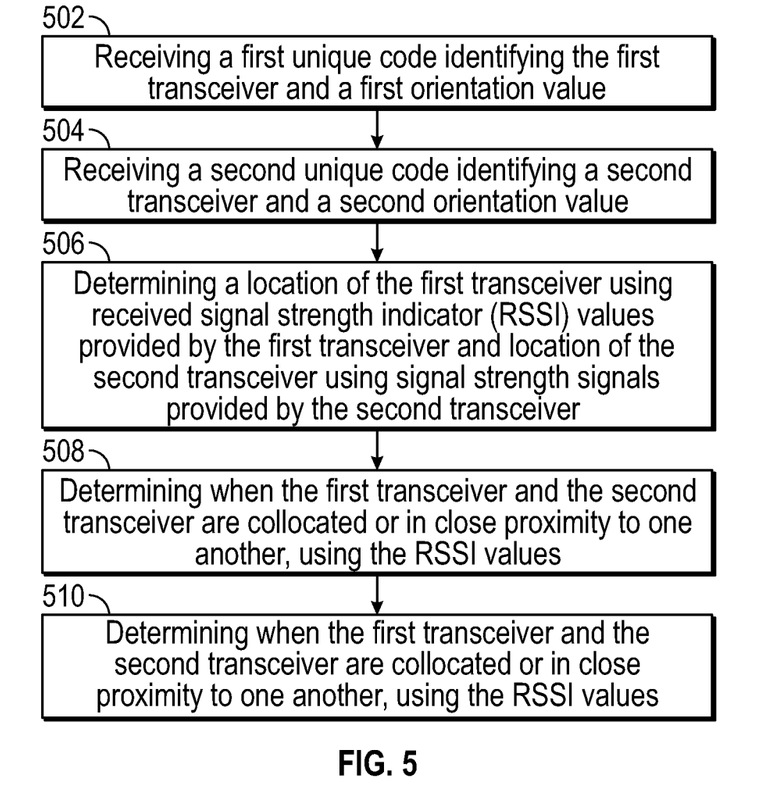
FIG. 5 is a flowchart of an example method of the present disclosure.

FIG. 5 is a flowchart of an example method of the present disclosure. The method includes a step 502 of receiving a first unique code identifying the first transceiver and a first orientation value. As noted above, the first transceiver is associated with a first seat belt buckle. The orientation value indicates whether the first transceiver is located on a left-hand side of a seat or a right-hand side of a seat.

Next, the method includes a step 504 of receiving a second unique code identifying a second transceiver and a second orientation value. Again, the second transceiver is associated with a second seat belt buckle. The orientation value likewise indicates whether the second transceiver is located on a left-hand side of a seat or a right-hand side of a seat.

The method can include a step 506 of determining a location of the first transceiver using received signal strength indicator values provided by the first transceiver and location of the second transceiver using signal strength signals provided by the second transceiver. The method can also include steps related to transmitting low-frequency signals that are received by the first transceiver and the second transceiver. These low-frequency signals are emitted from various low-frequency transmitters positioned around the interior of the vehicle.

Using the RSSI values, the method further includes a step 508 of determining when the first transceiver and the second transceiver are collocated or in close proximity to one another. For example, the RSSI values received from both the first transceiver and the second transceiver can be used determine that the first transceiver and the second transceiver are collocated. As noted above, this process can involve triangulation and/or trilateration using the RSSI values. Again, the signal strength signals are indicative of a distance between the first transceiver and the low power transmitters emitting the low power signals.

To be sure, each transceiver receives LF signals from each LF antenna or transmitter within the vehicle interior. The transceiver can measure the RSSI value of each received LF signal (one from each LF transmitter) then transmit those RSSI values to the vehicle receiver. Generally, the RSSI values may roll-off (e.g., RSS declines) as a distance from the LF antenna increases. The LF signal strength is further affected by absorption and reflections which may distort that signal strength roll-off. This can be addressed by calibrating the system whereas the LF transmitters are activated and the RSSI is measured at each belt buckle assembly (transceiver).

The method can include a step 510 of determining if the first transceiver and the second transceiver are associated with a single seat or are associated with two different seats using the first unique code, the second unique code, the first orientation value, and the second orientation value. As noted above, it is possible to determine if the first transceiver and the second transceiver are collocated as a dual buckle, which indicates that the first transceiver and the second transceiver are associated with the same seat, such as a double seat. It is possible that the first transceiver and the second transceiver are associated with two separate seats. The particular arrangement can be determined using not only the unique codes that specifically identify the transceivers but also the orientation values of the transceivers. The unique seat code and seat belt buckle assembly data stored in the vehicle receiver can also be used to specifically identify seat locations, even after rearrangement.

The vehicle receiver can also receive and display buckle statuses of both the first seat belt buckle and the second seat belt buckle. The statuses can be displayed by generating and displaying a representation of a seat with a representation of a buckle status of the first seat belt buckle. For example, the representation of the buckle status could include changing a color of the seat. When a buckle status is buckled, the color of the seat could be green, whereas when the buckle status is unbuckled the color of the seat could be red.

Figure 6:
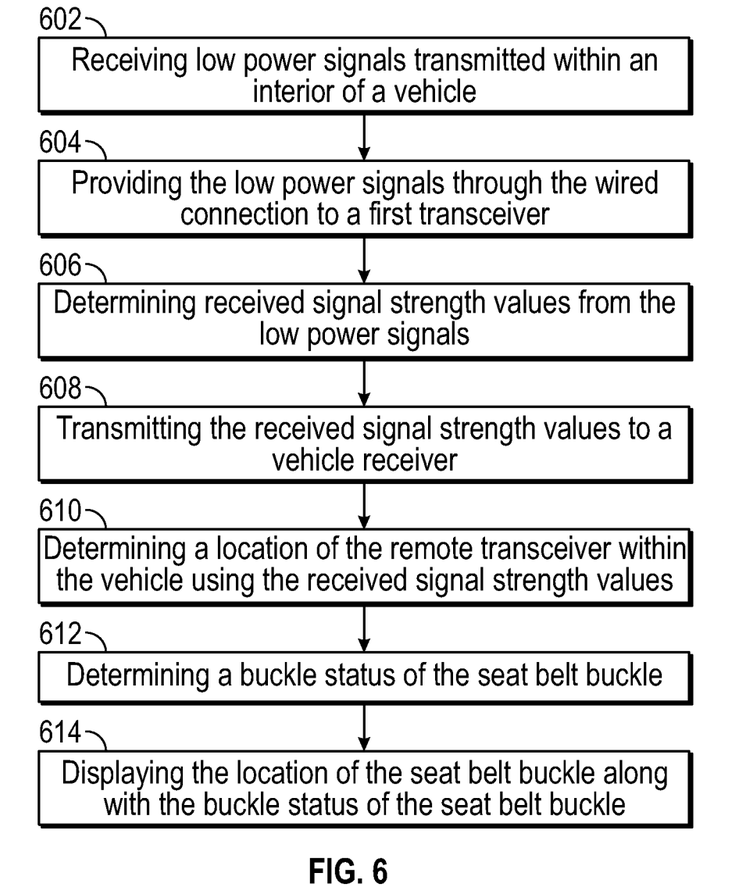
FIG. 6 is a flowchart of another example method of the present disclosure.

FIG. 6 illustrates an example method that can be performed using a system that includes the remote transceiver (see FIG. 4). The method can generally include a step 602 of receiving low power signals transmitted within an interior of a vehicle. Step 602 can be performed using a remote transceiver that is communicatively coupled with another seat belt buckle transceiver (e.g., first transceiver) over a wired connection. The method can include a step 604 of providing the low power signals through the wired connection to a first transceiver. Next, the method can include a step 606 of determining received signal strength indicator values from the low power signals. For example, the low power signals received by the remote transceiver can either be processed at the remote transceiver level, or can be processed by the first transceiver. The received signal strength values of the low power signals can be used to triangulate and/or trilaterate a general location of the remote transceiver within the vehicle. Next, the method can include a step 608 of transmitting the received signal strength values to a vehicle receiver. Rather than processing the low power signals at the remote transceiver or first transceiver, the received signal strength values can be calculated by the vehicle receiver.

The method can include a step 610 of determining a location of the remote transceiver within the vehicle using the received signal strength values. The method can include a step 612 of determining a buckle status of the seat belt buckle, as well as a step 614 of displaying the location of the seat belt buckle along with the buckle status of the seat belt buckle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A system, comprising:
    a remote transceiver that is centrally located on a seat that is configured to be rearranged within a vehicle, the remote transceiver comprising:
        a processor and memory for storing instructions that include a unique code identifying the remote transceiver, the processor executes the instructions to receive low power signals from a transmitter within an interior of the vehicle; and
    a first transceiver associated with a seat belt buckle of the seat, the first transceiver comprising a processor and memory for storing instructions that include a first unique code identifying the first transceiver, the processor being configured to:
        determine received signal strength values of the low power signals;
        transmit the received signal strength values to a vehicle receiver; and
        transmit a first orientation value of the seat belt buckle to a vehicle receiver, the first orientation value indicating an orientation of the seat belt buckle on a seat.

2. The system according to claim 1, further comprising the vehicle receiver, which is configured to use the received signal strength values to determine a location of the remote transceiver within the vehicle.

3. The system according to claim 1, wherein the first orientation value indicates either a right-handed position or a left-handed position of the seat belt buckle relative to the seat.

4. The system according to claim 3, wherein the vehicle receiver uses the first unique code and the first orientation value to differentiate the first transceiver from other transceivers within the vehicle.

5. The system according to claim 4, further comprising a buckle switch, wherein a buckle status of the seat belt buckle is buckled when the buckle switch indicates that a tongue of a seat belt has been inserted into the seat belt buckle, further wherein the buckle status is unbuckled when the buckle switch indicates that a tongue of a seat belt has not been inserted into the seat belt buckle, the first transceiver being configured to transmit the buckle status to the vehicle receiver.

6. The system according to claim 1, wherein the low power signals are received from the transmitter, as well as additional transmitters arranged around the interior of the vehicle.

7. The system according to claim 6, wherein the received signal strength values are indicative of a distance of the remote transceiver from the transmitter, further wherein additional received signal strength values are received from transmitters, the vehicle receiver being configured to triangulate and/or trilaterate a general location of the remote transceiver based on the received signal strength values and the additional received signal strength values.

8. The system according to claim 1, wherein the first transceiver is assigned to the seat and data indicative of the assignment is stored by the vehicle receiver.

9. A method, comprising:
    receiving low power signals transmitted within an interior of a vehicle by a remote transceiver;
    providing the low power signals through a wired connection to a first transceiver associated with a seat belt buckle of the vehicle;
    determining received signal strength values from the low power signals;
    transmitting the received signal strength values to a vehicle receiver; and
    transmitting a first orientation value of the seat belt buckle to the vehicle receiver, the first orientation value indicating an orientation of the seat belt buckle on a seat.

10. The method according to claim 9, further comprising determining a location of the remote transceiver within the vehicle using the received signal strength values.

11. The method according to claim 10, wherein the remote transceiver is centrally located on the seat, the seat being configured to be rearranged within the vehicle such that it can face forwardly or rearwardly.

12. The method according to claim 11, wherein the remote transceiver is disposed on a terminal end of the seat, such that when the seat is rearranged, regardless of an orientation of the seat, the remote transceiver is not collocated with another remote transceiver of an adjacent seat.

13. The method according to claim 10, further comprising determining a buckle status of the seat belt buckle.

14. The method according to claim 13, further comprising displaying the location of the seat belt buckle along with the buckle status of the seat belt buckle.

15. A vehicle, comprising:
- a remote transceiver that is centrally located on a seat that is configured to be rearranged within a vehicle, the remote transceiver comprising:
  - a processor and memory for storing instructions that include a unique code identifying the remote transceiver, the processor executes the instructions to receive low power signals from a transmitter within an interior of the vehicle; and
- a first transceiver associated with a seat belt buckle of the seat, the first transceiver comprising a processor and memory for storing instructions that include a first unique code identifying the first transceiver, the processor being configured to:
  - determine received signal strength values of the low power signals;
  - transmit the received signal strength values to a vehicle receiver; and
  - transmit a first orientation value of the seat belt buckle to a vehicle receiver, the first orientation value indicating an orientation of the seat belt buckle on a seat.

16. The vehicle according to claim 15, further comprising the vehicle receiver, which is configured to use the received signal strength values to determine a location of the remote transceiver within the vehicle.

17. The vehicle according to claim 16, wherein the first orientation value indicates either a right-handed position or a left-handed position of the seat belt buckle relative to the seat.

18. The vehicle according to claim 17, wherein the vehicle receiver uses the first unique code and the first orientation value to differentiate the first transceiver from other transceivers within the vehicle.

19. The vehicle according to claim 18, further comprising a buckle switch, wherein a buckle status of the seat belt buckle is buckled when the buckle switch indicates that a tongue of a seat belt has been inserted into the seat belt buckle, further wherein the buckle status is unbuckled when the buckle switch indicates that a tongue of a seat belt has not been inserted into the seat belt buckle, the first transceiver being configured to transmit the buckle status to the vehicle receiver.

* * * * *